3,135,172
HYDRAULIC JACKS

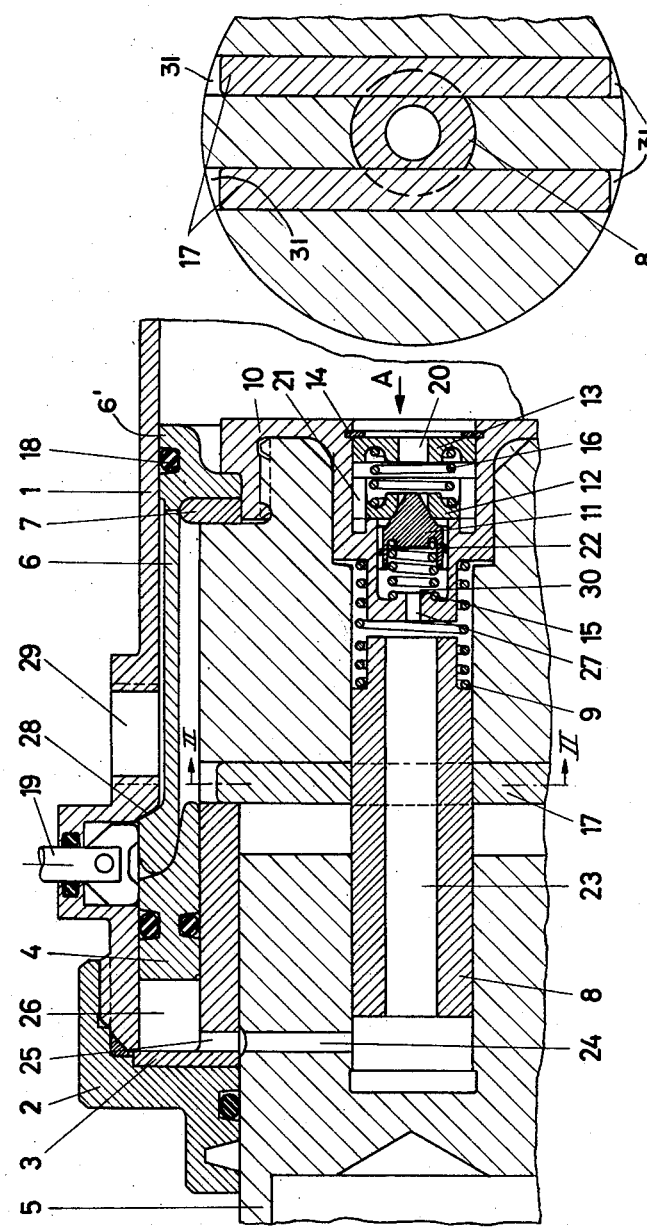
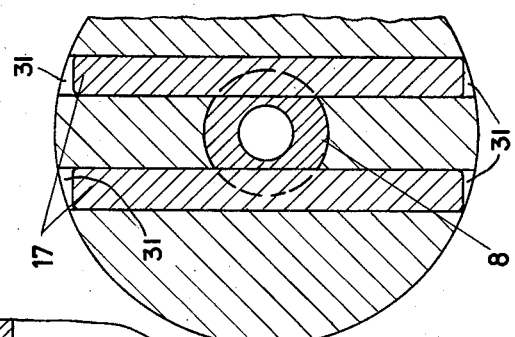

Willy Messerschmitt, Munich, Germany, assignor to Messerschmitt AG., Augsburg, Germany, a company of Germany
Filed Nov. 8, 1961, Ser. No. 150,926
Claims priority, application Germany Nov. 29, 1960
6 Claims. (Cl. 92—26)

This invention relates to hydraulic jacks and has for its main object to provide an improved hydraulic jack which is easy to operate and which can be locked in position by improved means.

In hydraulic jacks, locking systems are already known which have a spring cage as locking elements. In these systems, the locking of the spring cage is effected by spring force. Since these springs have to be relatively strong to produce the necessary spring pressure during the locking operation, and in addition the spring travel must be sufficient to enable the locking effect to be released, relatively long spring elements are required, and their length has an adverse effect on the overall length.

The invention obviates this disadvantage and gives short overall lengths for the locking system, since the locking operation is performed hydraulically with a spring cage locking system, in such manner that the locking piston is operated by the oil pressure which builds up inside the cylinder and then the spring cage is locked after engagement.

The interior of the cylinder is shut off from the chamber in which the locking piston moves by supplementary valves, so that an automatic movement of the locking piston is prevented, for example if the oil pressure in the interior of the cylinder drops.

The invention will now be described with reference to the accompanying drawing in which FIGURE 1 illustrates a preferred embodiment of the invention, and FIGURE 2 illustrates a section thereof taken on line II—II of FIGURE 1.

As shown on the drawing, a piston rod 5 is rigidly connected to a spring cage comprising segments 6 attached to a base portion 6' containing a piston seal 18 and arranged to be movable in a cylinder 1 which is closed by parts 2 and 3. The spring cage 6—6' is reinforced, and its segments are resiliently urged outwardly, by a supporting ring 7 functioning in a manner similar to that (ring 35) shown and described in Knights U.S. Patent No. 2,809,721, issued October 15, 1957, for "Telescopic Struts."

A locking piston 4 movable relatively to the piston rod 5 and the cylinder 1 is situated in the intermediate space between the cylinder 1 and the part 3 of the cylinder closure.

Inside the piston rod 5 there is disposed a supplementary valve which is rigidly connected to the piston rod by way of the valve housing 10. The supplementary valve consists of a control piston 8 provided with a pair of parallel grooves 31 carrying a pair of control pins 17, said piston 8 being movable by a spring 9 seated against the valve housing 10 in the piston rod 5. The valve housing 10 contains also a valve cone 11 which is pressed by a spring 15 against a valve disc 12 which in turn is urged toward valve cone 11 by way of a spring 16 seated against a spring disc 13. The spring disc 13 is retained in the valve housing by a snap ring 14, so that the valves are kept closed in the inoperative position. Valve cone 11 is provided with a plurality of ducts 22 as shown.

Piston 5 has a limited length of travel and can be locked at the end or limit of the piston stroke, at the time that bores 24 and 25 (to be described) are in communication with one another. Locking and unlocking of the piston rod 5 takes place in the following manner. An oil pressure is built up in the cylinder chamber A in known manner and causes the piston rod 5 to be extended, and in the end position of the piston rod the spring cage segments 6 engage in an annular widening 28 of the cylinder wall 1. At the same time, the control piston 8 is moved toward the valve housing 10 by the control pins 17 and bores 24 and 25 are opened in these conditions. The excess pressure in the interior A of the cylinder opens the valve 11 so that oil flows through a bore 20, chamber 21, the opening in valve disc 12, ducts 22 and through a bore 27 into the interior 23 of the control piston and thence through the bores 24 and 25 into the chamber 26 behind the locking piston 4. The oil pressure building up behind the locking piston 4 pushes the latter beneath the spring cage segments 6 and thus locks the piston rod 5 in the cylinder 1. If the oil pressure in the cylinder chamber A drops, the pressure is nevertheless maintained in the chamber 26 behind the locking piston 4 since the valves 11 and 12 are kept closed by spring force. The movement of spring cage segments 6 into annular widening 28, followed by movement of locking piston 4 beneath said segments 6 into the relative positions illustrated in FIGURE 1, causes portions of the segments 6 and of the locking piston 4 both to engage a member 19 which is thereby moved outwardly. This outward movement of member 19 occurs only when the structure is correctly locked, and said member 19 can accordingly be used as, or in conjunction with, a signalling device operative to show such correct locking.

For unlocking purposes, oil must be forced through an inlet 29 into the chamber between the locking piston 4 and the spring cage 6—6'. The oil in the chamber 26 is therefore compressed through the bores 24 and 25 into the chamber 30 behind the valve cone 11 until the pressure is greater than the force of the spring 16. At that moment, the valve disc opens and the oil flows through the grooves 21 and 22 and the bore 20 into the interior A of the cylinder. The locking piston then frees the spring cage and the piston rod can be retracted.

I claim:

1. A hydraulic jack comprising a cylinder, a piston rod therein movable by hydraulic fluid pressure, a spring cage locking system rigidly connected to said piston rod, a locking piston for operating said locking system, a chamber in said cylinder for said locking piston, and ducts whereby said chamber is placed into communication with fluid in the cylinder whereby as the pressure of said fluid in said chamber increases the locking piston is moved to operate the spring cage locking system.

2. A hydraulic jack comprising a cylinder, a piston rod therein operated by hydraulic fluid pressure in the cylinder, spring segments connected to said piston rod, a locking piston for operating said segments to lock the piston rod in position, a chamber for said locking piston, ducts whereby said chamber is placed into communication with the hydraulic fluid in the cylinder whereby the locking piston is moved to operate the segments by the fluid pressure in said chamber, and means for shutting off communication between said chamber and said cylinder.

3. A hydraulic jack comprising a cylinder, a piston rod therein operated by hydraulic fluid pressure in the cylinder, spring segments connected to said piston rod, a locking piston for operating said segments, a chamber for said piston, ducts between said chamber and the interior of said cylinder, and supplementary valves for controlling the flow of hydraulic fluid between the chamber and the interior of the cylinder.

4. A hydraulic jack comprising a cylinder, a piston rod therein operated by hydraulic fluid pressure in the cylinder, spring segments connected to said piston rod for locking the piston rod in position, a locking piston for operating said segments, a chamber for said piston, ducts between said chamber and the interior of said cylinder, supplementary valves between the interior of the cylinder and said chamber, and an inlet to said chamber for hydraulic fluid to move said piston and release the spring segments from locking engagement.

5. A hydraulic jack comprising a cylinder, a piston rod therein movable by hydraulic fluid pressure, a spring cage locking system rigidly connected to said piston rod, a locking piston relatively freely movable between first and second positions adjacent said piston rod for operating said locking system, and means for selectively applying a fluid pressure to one or the opposite end of said locking piston whereby said locking piston is operated by fluid pressure to move from one to the other of its said first and second positions thereby to lock and unlock said locking system, said means for applying a fluid pressure to one end of said locking piston including valve means for communicating a first control pressure to said one end of said locking piston, said valve means being operative to close thereby to retain at least a portion of said first control pressure against said one end of said locking piston after said locking piston has moved into a selected one of its said first and second positions, said means for applying a fluid pressure to the opposite end of said locking piston comprising duct means in communication with said opposite end of said locking piston and adapted to subject said opposite end to a second control pressure in excess of that retained against said one end of said locking piston thereby to effect a differential pressure between the ends of said locking piston operative to move said locking piston into the other of its said first and second positions.

6. The arrangement of claim 5 wherein said valve means includes duct means communicating with the hydraulic fluid pressure which is applied to said piston rod thereby to effect said first control pressure.

References Cited in the file of this patent
UNITED STATES PATENTS

| | | |
|---|---|---|
| 2,221,979 | Levy | Nov. 19, 1940 |
| 2,809,721 | Knights | Oct. 15, 1957 |
| 2,949,889 | Ivankovics et al. | Aug. 23, 1960 |
| 3,003,471 | Bodem | Oct. 10, 1961 |